United States Patent
Hirakawa et al.

(10) Patent No.: US 6,376,416 B1
(45) Date of Patent: Apr. 23, 2002

(54) OLEFIN POLYMERIZATION CATALYST AND PROCESS FOR PRODUCING OLEFIN POLYMER

(75) Inventors: Katsumi Hirakawa, Yokkaichi; Yumito Uehara, Tokyo-To, both of (JP)

(73) Assignee: Japan Polychem Corporation, Tokyo (JP)

( * ) Notice: Subject to any disclaimer, the term of this patent is extended or adjusted under 35 U.S.C. 154(b) by 0 days.

(21) Appl. No.: 09/357,944

(22) Filed: Jul. 21, 1999

(30) Foreign Application Priority Data

Jul. 21, 1998 (JP) .......................................... 10-205032

(51) Int. Cl.[7] .......................... B01J 31/00; B01J 37/00; C08F 4/02; C08F 4/60
(52) U.S. Cl. ...................... 502/120; 502/113; 502/115
(58) Field of Search ................................ 502/113, 115, 502/120

(56) References Cited

U.S. PATENT DOCUMENTS

| | | | | |
|---|---|---|---|---|
| 4,530,914 A | * | 7/1985 | Ewen et al. ................. | 502/113 |
| 4,659,685 A | * | 4/1987 | Coleman, III et al. ...... | 502/113 |
| 4,701,432 A | * | 10/1987 | Welborn, Jr. ................ | 502/115 |
| 4,937,299 A | * | 6/1990 | Ewen et al. ................. | 502/113 |
| 4,939,217 A | * | 7/1990 | Stricklen .................... | 502/113 |
| 4,975,403 A | * | 12/1990 | Ewen ......................... | 502/113 |
| 5,032,562 A | * | 7/1991 | Lo et al. ..................... | 502/120 |
| 5,120,696 A | * | 6/1992 | Tsutsui et al. ............... | 502/113 |
| 5,145,818 A | * | 9/1992 | Tsutsui et al. ............... | 502/113 |
| 5,266,544 A | * | 11/1993 | Tsutsui et al. ............... | 502/113 |
| 5,308,811 A | * | 5/1994 | Suga et al. .................. | 502/118 |
| 5,529,965 A | * | 6/1996 | Chang ........................ | 502/113 |
| 5,614,456 A | * | 3/1997 | Mink et al. .................. | 502/113 |
| 5,648,428 A | * | 7/1997 | Reddy et al. ................ | 502/113 |
| 5,691,264 A | * | 11/1997 | Sacchetti et al. ............ | 502/113 |
| 5,693,583 A | * | 12/1997 | Hagerty et al. .............. | 502/115 |
| 5,830,820 A | * | 11/1998 | Yano et al. .................. | 502/120 |
| 5,928,982 A | * | 7/1999 | Suga et al. .................. | 502/120 |
| 6,001,766 A | * | 12/1999 | Kissin et al. ................ | 502/113 |
| 6,037,296 A | * | 3/2000 | Hsieh et al. ................. | 502/115 |
| 6,051,525 A | * | 4/2000 | Lo et al. ..................... | 502/113 |

FOREIGN PATENT DOCUMENTS

| | | |
|---|---|---|
| JP | 3-203903 | 9/1991 |
| JP | 5-105718 | 4/1993 |

OTHER PUBLICATIONS

Chemical Abstracts, vol. 121, No. 24, Dec. 12, 1994, AN 281437, JP 06 136046, May 17, 1994.
Chemical Abstracts, vol. 121, No. 26, Dec. 26, 1994, AN 301586, JP 06 136049, May 17, 1994.
Chemical Abstracts, vol. 129, No. 12, Sep. 21, 1998, AN 149380, JP 10 182737, Jul. 7, 1998.

* cited by examiner

*Primary Examiner*—Elizabeth Wood
*Assistant Examiner*—J. Pasterczyk
(74) *Attorney, Agent, or Firm*—Oblon, Spivak, McClelland, Maier & Neustadt, P.C.

(57) ABSTRACT

The present invention provides a method of making a catalyst with the following components:

Component (A): A solid catalyst component comprising the following component (A-1) and component (A-2).
- Component (A-1): A solid component obtained by contacting the following component (A-1-1), component (A-1-2) and component (A-1-3).
  - Component (A-1-1): an ion-exchangeable layered silicate
  - Component (A-1-2): a magnesium compound
  - Component (A-1-3): a titanium compound
- Component (A-2): A metallocene-type transition metal compound Component (B): An organic aluminum compound.

10 Claims, No Drawings

OLEFIN POLYMERIZATION CATALYST AND PROCESS FOR PRODUCING OLEFIN POLYMER

BACKGROUND OF THE INVENTION

1. Field of the Invention

The present invention relates to an olefin polymerization catalyst and to an olefin polymer production process. More specifically, the invention relates to a catalyst and process for production of olefin polymers with excellent moldability, using a solid catalyst component comprising a combination of a specifically treated clay compound and a metallocene compound.

2. Background Art

In recent years, metallocene catalysts with excellent polymerizing properties that give olefin polymers with a narrow composition distribution have been developed. Such catalysts, however, have generally had a drawback of poor moldability of products due to a very narrow molecular weight distribution thereof.

Olefin polymerization processes aimed at improving moldability have therefore been proposed. As examples there may be mentioned a process of combining a plurality of metallocene compounds with different extension reaction rate constants and termination reaction rate constants (Japanese Patent Laid-Open Publication No. 60-35008), a process of using a metallocene compound having a ligand with a special constrained geometric structure (Japanese Patent Laid-Open Publication No. 3-163008), and processes of combining metallocene-type catalysts and Ziegler-type catalysts using alumoxanes as an activator (Japanese Patent Laid-Open Publication No. 63-501369, Japanese Patent Laid-Open Publication No. 1-503715 and Japanese Patent Laid-Open Publication No. 3-203903). However, while such methods do provide some improving effects, their effects are still inadequate so that further improvement is desired.

On the other hand, because methylalumoxane used with metallocene catalysts is very expensive, olefin polymerization processes have been proposed that use no methylalumoxane. For example, there is known a process using a clay compound (Japanese Patent Laid-Open Publication No.5-301917). There have also been disclosed processes of combining a metallocene compound with a non-metallocene transition metal compound, for the purpose of improved moldability (Japanese Patent Laid-Open Publication No. 6-136046 and No. 9-132613). To the knowledge of the present inventors, however, all of these processes still provide inadequate effects of improved moldability.

SUMMARY OF THE INVENTION

It is therefore an object of the present invention to provide an olefin polymerization catalyst and process which allow production of olefin polymers with excellent moldability, and exhibiting excellent activity.

The present invention offers a solution to the aforementioned problems by using a specific solid catalyst component comprising a combination of a specifically treated clay compound and a metallocene compound.

That is, the olefin polymerization catalyst according to the present invention is characterized by comprising the following component (A) and component (B);

component (A): a solid catalyst component comprising the following component (A-1) and component (A-2).
  component (A-1): a solid component obtained by contacting the following component (A-1-1), component (A-1-2) and component (A-1-3).
    component (A-1-1): an ion-exchangeable layered silicate
    component (A-1-2): a magnesium compound
    component (A-1-3): a titanium compound
  component (A-2): a metallocene-type transition metal compound component (B): an organic aluminum compound.

The olefin polymer production process according to the present invention is characterized by contacting an olefin with the aforementioned olefin polymerization catalyst for its polymerization.

According to the invention, there are provided polymers with excellent moldability due to a wider molecular weight distribution (i.e. a larger ratio Mw/Mn between weight-average molecular weight (Mw) and number-average molecular weight (Mn) (Q value)) and a larger FR and melt tension (MT), compared to olefin polymers produced by polymerizing olefins in the presence of catalysts using conventional metallocene-type transition metal compounds.

DESCRIPTION OF THE PREFERRED EMBODIMENTS

[Olefin Polymerization Catalyst]

The olefin polymerization catalyst according to the present invention comprises component (A) and component (B). Here, "comprises" means not only combinations of the indicated component (A) and component (B) alone, but also encompasses combinations of adjuvant components other than component (A) component (B) but for the same purpose, that are added to component (A) and component (B).

<Component (A)/solid Catalyst Component>

Component (A) is a solid catalyst component comprising the following component (A-1) and component (A-2). Here as well, "comprises" not only means combinations of the indicated component (A-1) and component (A-2) but also encompasses combinations thereof with adjuvant components for the same purpose.

<<Component (A-1)>>

Component (A-1) is a solid component obtained by contacting the following component (A-1-1), component (A-1-2) and component (A-1-3), or if necessary a solid component obtained by further contacting component (A-1-4) therewith.

The term "containing" as used herein is intended to mean not only that components (A-1-1), (A-1-2), (A-1-3) and, if desired, (A-1-4) are brought into contact with each other, but also that component (A-1-2) obtained by contacting an inorganic magnesium compound with a titanium compound such as (A-1-3) is brought into contact with component (A-1-1) and component (A-1-4) to obtain component (A).

Component (A-1-1)

Component (A-1-1) is an ion-exchangeable layered silicate.

The ion-exchangeable layered silicate used for the invention is a silicate compound having a crystalline structure wherein planes constructed by ion-bonding, etc. are stacked together in parallel by weak bonding, the ions contained in which are exchangeable. Ion-exchangeable layered silicates are for the most part produced naturally as the major components of primarily clay minerals, but these ion-exchangeable layered silicates are not particularly limited to natural products and may be artificially synthesized substances.

As specific examples of ion-exchangeable layered silicates there may be mentioned the following publicly known layered silicates listed in "Clay Mineralogy" by Haruo Shiramizu, Asakura Shoten Publications (1995) and elsewhere: (a) the kaolin group, for example dickite, nacrite, kaolinite, anoxite, metahalloysite, halloysite, etc., (b) the serpentine group, for example, chrysotile, lizardite, antigorite, etc., (c) the smectite group, for example montmorillonite, sauconite, beidellite, nontronite, saponite, hectorite, stevensite, etc., (d) the vermiculite group, for example vermiculite, etc., (e) the mica group, for example mica, illite, cerisite, glauconite, etc., and (f) others, for example attapulgite, sepiolite, palygorskite, bentonite, pyroferrite, talc, chlorite, etc. These may be used to form mixed layers as well. Preferred among these are smectites such as montmorillonite, sauconite, beidellite, nontronite, saponite, hectorite and stevensite, bentonite and teniolite, vermiculites such as vermiculite, and micas such as mica, illite, cerisite and glauconite.

The ion-exchangeable layered silicate preferably has a volume of 0.1 cc/g or greater, and especially 0.3–5 cc/g, of pores with a radius of at least 20 Angstroms as measured by the mercury injection method.

The ion-exchangeable layered silicate can be used directly without any particularly special treatment, but it may be subjected to chemical treatment for removal of impurities adhering to the surface, for increase of the surface area, for control of the interlayer distance or for conversion of the crystal structure of the clay. Specifically there may be mentioned acid treatment, alkali treatment, salt treatment, organic substance treatment, etc. Acid treatment and salt treatment are preferred.

For salt treatment, at least 40% and preferably at least 60% of the exchangeable metal cations contained in the ion-exchangeable layered silicate prior to treatment are preferably ion-exchanged with dissociated cations of the salt. The salt used in treatment is preferably a salt comprising a cation of an atom of Group 2–14 and an anion selected from halogen atoms, inorganic acids and organic acids. For acid treatment, the treatment is preferably carried out with hydrochloric acid, sulfuric acid, nitric acid, acetic acid, oxalic acid or the like. The treatment conditions are not particularly restricted, but normally the salt and acid concentrations are 0.1–30 wt % and the treatment temperature is 0–100° C.

According to the invention, it is preferred that the adsorbed water and interlaminar water in the ion-exchangeable layered silicate be normally removed prior to use. Here, adsorbed water is water adsorbed onto the surface of the ion-exchangeable layered silicate particles, and interlaminar water is water present between the crystal layers. The method of dehydration the ion-exchangeable layered silicate is not particularly restricted, and heated dehydration, heated dehydration under a gas stream, dehydration under reduced pressure, azeotropic distillation with an organic solvent, etc. may be employed. Heating is carried out at 100° C. or above and preferably 150° C. or above, but preferably not at conditions which destroy the structure. It is therefore preferred for the moisture content to be no greater than 3 wt % preferably no greater than 1 wt %, and more preferably no greater than 0.5 wt %. as measured after drying for 2 hours under conditions of 200° C., 1 mmHg pressure.

Component (A-1-2)

(A-1-2) of the invention is a magnesium compound. A "magnesium compound" according to the invention is preferably one which is either soluble or dispersible itself in any of the catalyst preparation processes according to the invention. (Here, "soluble itself" includes compounds solubilized by complexing agent treatment or other treatment of the compound itself.)

Specific preferred examples of component (A-1-2) include (I) organic magnesium compounds, (II) contact solutions of inorganic magnesium compounds and titanium compounds (A-1-3), and (III) contact solutions of inorganic magnesium compounds and electron donating compounds.

(I) First, for the organic magnesium compound of the invention there may be used a publicly known organic magnesium compound having at least one Mg—C bond. It is preferably a dialkyl(aryl) magnesium compound represented by the general formula $R^1R^2Mg$ or a Grignard compound represented by the general formula $R^3MgX$. Here, $R^1$, $R^2$ and $R^3$ are hydrocarbon residues of 1–20 carbon atoms that may be the same or different, and X is a halogen. Specifically, (a) compounds represented by the general formula $R_1R^2Mg$ include dimethylmagnesium, diethylmagnesium, di-n-propylmagnesium, di-i-propylmagnesium, di-n-butylmagnesium, di-s-butylmagnesium, di-t-butylmagnesium, diamylmagnesium, dihexylmagnesium, dicyclohexylmagnesium, diphenylmagnesium, butylethylmagnesium, etc.; (b) compounds represented by the general formula $R^3MgX$ include methylmagnesium chloride, methylmagnesium bromide, methylmagnesium iodide, ethylmagnesium chloride, ethylmagnesium bromide, n-propylmagnesium chloride, i-propylmagnesium chloride, n-butylmagnesium chloride, s-butylmagnesium chloride, t-butylmagnesium chloride, amylmagnesium chloride, isoamylmagnesium chloride, hexylmagnesium chloride, cyclohexylmagnesium chloride, phenylmagnesium chloride, phenylmagnesium bromide, etc. Any of these within each group and/or of different groups may be mixed together, or they may be in complexes with other compounds as compound salts. Preferred for use as complexing agents are organic metal compounds of Li, Be, B, Al and Zn.

The organic magnesium compound is usually contacted with the other components in a state of solution or suspension in a solvent. The solvent used for the organic magnesium compound of the invention may be aliphatic or aromatic hydrocarbons, or ethers. Specific examples thereof include (a) hydrocarbon compounds of 4–20 carbon atoms such as butane, pentane, hexane, heptane, octane, decane, cyclohexane, benzene, toluene, xylene, etc. and (b) ethers of 2–20 carbon atoms such as dimethyl ether, diethyl ether, diisopropyl ether, dibutyl ether, diisoamyl ether, epichlorhydrin, tetrahydrofuran, dioxane, anisole, diphenyl ether, etc. These solvents may also be used in combinations of two or more.

(II) Another specific example of (A-1-2) of the invention is a contact solution of an inorganic magnesium compound and a titanium compound (component (A-1-3)).

The magnesium compound used may be a publicly known magnesium compound. Specifically there may be mentioned (a) magnesium dihalides, for example $MgF_2$, $MgCl_2$, $MgBr_2$, $MgI_2$, etc.; (b) magnesium alcoholates, for example $Mg(OEt)_2$, $Mg(OBu)_2$, $Mg(OPh)_2$, etc.; (c) halomagnesiumoxy compounds, for example $Mg(OH)Cl$, $Mg(OEt)Cl$, $Mg(OPh)Cl$, etc.; (d) organic acid magnesium salts, for example $Mg(OCOCH_3)_2$, $Mg(OCOC_{17}H_{35})_2$, $Mg(OCOC_6H_5)_2$, etc.; (e) inorganic acid magnesium salts and other compounds, for example $Mg(OH)_2$, $MgO$, $MgCO_3$, $MgSO_4$, etc. These may also be used in admixture with each other, or may be used as complexes with other compounds in the form of compound salts. Preferred among these are (a) magnesium dihalides and (b) magnesium alcoholates.

As titanium compounds there may be mentioned compounds represented by the general formula $Ti(OR^4)_{4-k}X_k$ (where $R^4$ is a hydrocarbon residue, preferably with about 1–10 carbon atoms, X represents a halogen, and k represents a number such that $0 \leq k \leq 4$). Specifically there may be mentioned $TiCl_4$, $TiBr_4$, $Ti(OC_2H_5)Cl_3$, $Ti(OC_2H_5)_2Cl_2$, $Ti(OC_2H_5)_3Cl$, $Ti(OiC_3H_7)Cl_3$, $Ti(OnC_4H_9)Cl_3$, $Ti(OnC_4H_9)_2Cl_2$, $Ti(OnC_4H_9)_3Cl$, $Ti(OiC_4H_9)Cl_3$, $Ti(OsecC_4H_9)Cl_3$, $Ti(OtC_4H_9)Cl_3$, $Ti(OC_5H_{11})Cl_3$, $Ti(OC_6H_{13})Cl_3$, $Ti(OC_8H_{17})Cl_3$, $Ti(OcC_6H_{11})Cl_3$, $Ti(OC_6H_5)Cl_3$, $Ti(OnC_4H_9)Br_3$, $Ti(OC_2H_5)Cl_4$, $Ti(OnC_3H_7)_4$, $Ti(OiC_3H7)_4$, $Ti(OnC_4H_9)_4$, $Ti(OnC_6H_{13})_4$, $Ti(OnC_8H_{17})_4$, $Ti(OCH_2CH(C_2H_5)C_4H_9)_4$, etc.

As titanium compounds there may be used the polytitanic acid esters represented by the following general formula.

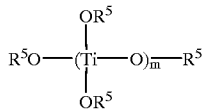

where $R^5$ represents the same or different hydrocarbon residues, preferably with 1–10 carbon atoms. Especially preferred are aliphatic hydrocarbon residues of 2–6 carbon atoms. The value of m is preferably selected so that the polytitanic acid ester is liquid either itself or in solution form, and usually represents a number such that $2 \leq m \leq 10$.

Specific examples of such compounds include isopropyl polytitanate, normal-butyl polytitanate, normal-hexyl polytitanate and 2-ethylhexyl polytitanate.

There may also be used trivalent titanium compounds represented by the general formula $Ti(OR^6)_{3-n}X_n$ (where $R^6$ is a hydrocarbon residue, preferably with about 1–10 carbon atoms, X represents a halogen, and n represents a number such that $0 \leq n \leq 3$). Specific examples of such titanium compounds include $TiCl_3$, $TiBr_3$, $Ti(OC_2H_5)Cl_2$, $Ti(OC_2H_5)_3$, etc. These may also be used in admixture with each other.

Preferred among these are alkoxy group-containing titanium compounds, with tetraalkoxytitanium compounds being more preferred.

Their dissolution may be accomplished by any publicly known method. The preferred method is contact while stirring in the presence of an inert diluting agent during the dissolution. The inert diluting agent used here is preferably an aliphatic or aromatic hydrocarbon or halohydrocarbon. For the contact there may be included components other than those mentioned above, for example electron donators such as alcohols, ethers, ketones, esters, etc., organic aluminum compounds, halogenated silicon compounds and organic silicon compounds, so long as the effect of the invention is not hindered. The contact temperature is generally about $-50°$ C. to $200°$ C. and preferably $0°$ C. to $120°$ C., and the contact time is at least 3 minutes, and preferably 0.5–24 hours.

The amount of the titanium compound used for the dissolution is about 0.01–100, and preferably 0.1–10, in terms of molar ratio with respect to the magnesium compound.

(III) Another specific example of (A-1-2) of the invention is a contact solution of an inorganic magnesium compound and an electron donating compound.

The inorganic magnesium compound used may be a publicly known magnesium compound. Specifically there may be mentioned (a) magnesium dihalides such as $MgF_2$, $MgCl_2$, $MgBr_2$, $MgI_2$, etc.; (b) magnesium alcoholates, for example $Mg(OEt)_2$, $Mg(OBu)_2$, $Mg(OPh)_2$, etc.; (c) halomagnesiumoxy compounds, for example $Mg(OH)Cl$, $Mg(OEt)Cl$, $Mg(OPh)Cl$, etc.; (d) organic acid magnesium salts, for example $Mg(OCOCH_3)_2$, $Mg(OCOC_{17}H_{35})_2$, $Mg(OCOC_6H_5)_2$, etc., (e) inorganic acid magnesium salts and other compounds, for example $Mg(OH)_2$, MgO, $MgCO_3$, $MgSO_4$, etc. These may also be used in admixture with each other, or may be used as complexes with other compounds in the form of compound salts. Preferred among these are (a) magnesium dihalides and (b) magnesium alcoholates.

Examples of electron donating compounds include oxygen-containing electron donors such as alcohols, phenols, ketones, aldehydes, carboxylic acids, organic acid and inorganic acid esters, ethers, acid amides and acid anhydrides, and nitrogen-containing electron donors such as ammonia, amines, nitriles and isocyanates. Specifically there may be mentioned (a) alcohols, preferably of 1–18 carbon atoms, specifically methanol, ethanol, propanol, butanol, pentanol, hexanol, octanol, 2-ethylhexanol, dodecanol, octadecyl alcohol, benzyl alcohol, phenyl ethyl alcohol, etc.; (b) substituted and unsubstituted phenols, for example phenol, cresol, xylenol, ethyl phenol, propyl phenol, nonyl phenol, naphthol, etc.; (c) ketones, preferably of 3–15 carbon atoms, specifically acetone, methyl ethyl ketone, methyl isobutyl ketone, acetophenone, benzophenone, etc.; (d) aldehydes, preferably of 2–15 carbon atoms, specifically acetaldehyde, propionaldehyde, octylaldehyde, benzaldehyde, etc.; (e) organic acid esters, preferably of 2–20 carbon atoms, specifically methyl formate, methyl acetate, ethyl acetate, vinyl acetate, propyl acetate, octyl acetate, cellosolve acetate, ethyl propionate, methyl butyrate, ethyl valerate, ethyl stearate, ethyl chloroacetate, methyl methacrylate, ethyl crotonate, ethyl benzoate, phenyl benzoate, ethyl tolylate, ethyl anisate, dibutyl phthalate, γ-butyrolactone, α-valerolactone, ethylene carbonate, etc., and inorganic acid esters, for example trimethyl borate, tetraethyl silicate, tributyl phosphate, tributyl phosphite, etc.; (f) ethers, preferably of 2–20 carbon atoms, specifically methyl ether, ethyl ether, isopropyl ether, butyl ether, isoamyl ether, epichlorhydrin, tetrahydrofuran, dioxane, anisole, etc.; (g) acid amides, for example dimethylformamide, dimethylacetamide, acetamide, benzoic amide, etc.; (h) amines, for example methylamine, ethylamine, diethylamine, triethylamine, tributylamine, piperidine, pyridine, tetramethyl ethylenediamine, etc.; (i) nitriles, for example acetonitrile, benzonitrile, etc. These electron donors may be used in combinations of two or more. Preferred among these are alcohols, ethers and esters, with alcohols being particularly preferred.

Their dissolution may be accomplished by any publicly known method. The preferred method is contact while stirring in the presence of an inert diluting agent during the dissolution. The inert diluting agent used here is preferably an aliphatic or aromatic hydrocarbon or halohydrocarbon. For the contact there may be included components other than those mentioned above, for example titanium compounds, organic aluminum compounds, halogenated silicon compounds and organic silicon compounds, so long as the effect of the invention is not hindered. The contact temperature is generally about $-50°$ C. to $200°$ C. and preferably $0°$ C. to $120°$ C., and the contact time is at least 3 minutes, and preferably 0.5–24 hours.

The amount of the electron donating compound used for the dissolution is about 0.01–100, and preferably 0.1–10, in terms of the molar ratio with respect to the magnesium compound.

Component (A-1-3)

(A-1-3) of the invention is a titanium compound. A "titanium compound" is preferably one which is either soluble or dispersible itself in any of the catalyst preparation processes according to the invention. (Here, "soluble itself" includes compounds solubilized by complexing agent treatment or other treatment of the compound itself.)

As titanium compounds according to the invention there may be mentioned compounds represented by the general formula $Ti(OR^7)_{4-p}X_p$ (where $R^7$ is a hydrocarbon residue, preferably with about 1–10 carbon atoms, X represents a halogen, and p represents a number such that $0 \leq p \leq 4$). Specifically there may be mentioned $TiCl_4$, $TiBr_4$, $Ti(OC_2H_5)Cl_3$, $Ti(OC_2H_5)_2Cl_2$, $Ti(OC_2H_5)_3Cl$, $Ti(OiC_3H_7)Cl_3$, $Ti(OnC_4H_9)Cl_3$, $Ti(OnC_4H_9)_2Cl_2$, $Ti(OnC_4H_9)_3Cl$, $Ti(OiC_4H_9)Cl_3$, $Ti(OsecC_4H_9)Cl_3$, $Ti(OtC_4H_9)Cl_3$, $Ti(OC_5H_{11})Cl_3$, $Ti(OC_6H_{13})Cl_3$, $Ti(OC_8H_{17})Cl_3$, $Ti(OcC_6H_{11})Cl_3$, $Ti(OC_6H_5)Cl_3$, $Ti(OnC_4H_9)Br_3$, $Ti(OC_2H_5)_4$, $Ti(OnC_3H_7)_4$, $Ti(OiC_3H_7)_4$, $Ti(OnC_4H_9)_4$, $Ti(OnC_6H_{13})_4$, $Ti(OnC_8H_{17})_4$, $Ti(OCH_2CH(C_2H_5)C_4H_9)_4$, etc. There may also be used molecular compounds obtained by reacting electron donors with these. As such molecular compounds there may be mentioned $TiCl_4 \cdot CH_3COC_2H_5$, $TiCl_4 \cdot CH_3COOC_2H_5$, $TiCl_4 \cdot CH_3COCl$, $TiCl_4 \cdot C_6H_5COOC_2H_5$, etc.

Polytitanic acid esters represented by the following general formula may also be used.

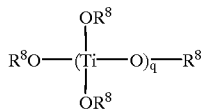

where $R_8$ represents the same or different hydrocarbon residues, preferably with 1–10 carbon atoms. Especially preferred are aliphatic hydrocarbon residues of 2–6 carbon atoms. The value of q is normally such that $2 \leq q \leq 10$.

Specific examples of such compounds include isopropyl polytitanate, normal-butyl polytitanate, normal-hexyl polytitanate and 2-ethylhexyl polytitanate.

There may also be used trivalent titanium compounds represented by the general formula $Ti(OR^9)_{3-r}X_r$ (where $R^9$ is a hydrocarbon residue, preferably with about 1–10 carbon atoms, X represents a halogen, and r represents a number such that $0 \leq r \leq 3$). Specific examples of such titanium compounds include $TiCl_3$, $TiBr_3$, $Ti(OC_2H_5)Cl_2$, $Ti(OC_2H_5)_3$, etc. These may also be used in admixture with each other.

Preferred among these are halogenated titanium compounds and tetraalkoxytitanium compounds.

Component (A-1-4)

(A-1-4) of the invention is a compound selected from among halogenated titanium compounds, halogenated silicon compounds and halogenated aluminum compounds.

As halogenated titanium compounds there may be mentioned compounds represented by the general formula $Ti(OR^{10})_{4-s}X_s$ (where $R^{10}$ is a hydrocarbon residue, preferably with about 1–10 carbon atoms, X represents a halogen, and s represents a number such that $1 \leq s \leq 4$). Specifically there may be mentioned $TiCl_4$, $TiBr4$, $Ti(OC_2H_5)Cl_3$, $Ti(OC_2H_5)_2Cl_2$, $Ti(OC_2H_5)_3Cl$, $Ti(OiC_3H_7)Cl_3$, $Ti(OnC_4H_9)Cl_3$, $Ti(OnC_4H_9)_2Cl_2$, $Ti(OnC_4H_9)_3Cl$, $Ti(OiC_4H_9)Cl_3$, Ti $(OsecC_4H_9)Cl_3$, $Ti(OtC_4H_9)Cl_3$, $Ti(OC_5H_{11})Cl_3$, $Ti(OC_6H_{13})Cl_3$, $Ti(OC_8H_{17})Cl_3$, $Ti(OcC_6H_{11})Cl_3$, $Ti(OC_6H_5)Cl_3$, $Ti(OnC_4H_9)Br_3$, etc. There may also be used molecular compounds obtained by reacting electron donors with these. As such molecular compounds there may be mentioned $TiCl_4 \cdot CH_3COC_2H_5$, $TiCl_4 \cdot CH_3COOC_2H_5$, $TiCl_4 \cdot CH_3COCl$, $TiCl_4 \cdot C_6H_5COOC_2H_5$, etc. There may also be used trivalent titanium compounds represented by the general formula $Ti(OR^{11})_{3-t}X_t$ (where $R^{11}$ is a hydrocarbon residue, preferably with about 1–10 carbon atoms, X represents a halogen, and t represents a number such that $1 \leq t \leq 3$). Specific examples of such titanium compounds include $TiCl_3$, $TiBr_3$, $Ti(OC_2H_5)Cl_2$, etc.

As halogenated silicon compounds there may be mentioned compounds represented by the general formula $Si(OR^{12})_uR^{13}_vX_w$ (where $R^{12}$ and $R^{13}$ represent the same or different hydrocarbon residues, preferably with about 1–10 carbon atoms, or hydrogen atoms, X represents a halogen, and u, v and w represent numbers such that $0 \leq u \leq 3$, $0 \leq v \leq 3$, and $1 \leq w \leq 4$, provided that u+v+w=4). Specifically there may be mentioned $SiCl_4$, $SiBr_4$, $HSiCl_3$, $CH_3SiCl_3$, $C_2H_5SiCl_3$, $C_3H_7SiCl_3$, $C_4H_9SiCl_3$, $C_8H_{17}SiCl_3$, $C_6H_5SiCl_3$, $(CH_3)_2SiCl_2$, $(C_2H_5)_2SiCl_2$, $(C_6H_5)_2SiCl_2$, $(CH_3)_3SiCl$, $Si(OCH_3)Cl_3$, $Si(OC_2H_5)Cl_3$, $Si(OC_2H_5)_2Cl_2$, $Si(OC_2H_5)_3Cl$, $Si(OiC_3H_7)Cl_3$, $Si(OnC_4H_9)Cl_3$, $Si(OnC_4H_9)_2Cl_2$, $Si(OnC_4H_9)_3Cl$, $Si(OiC_4H_9)Cl_3$, $Si(OsecC_4H_9)Cl_3$, $Si(OtC_4H_9)Cl_3$, $Si(OC_6H_{35})Cl_5$, $HSi(OCH_3)Cl_2$, $CH_3Si(OCH_3)Cl_2$, $CH_3Si(OC_2H_5)Cl_2$, $C_2H_5Si(OCH_3)Cl_2$, $(CH_3)_2Si(OCH_3)Cl$, etc.

As halogenated aluminum compounds there may be mentioned compounds represented by the general formula $AlR^{14}_x(OR^{15})_yX_z$ (where $R^{14}$ and $R^{15}$ represent the same or different hydrocarbon residues of 1–20 carbon atoms or hydrogen atoms, X represents a halogen, and x, y and z represent numbers such that $0 \leq x < 3$, $0 \leq y < 3$, and $0 < z \leq 3$, provided that x+y+z=3). Specifically there may be mentioned diethylaluminum chloride, diisobutylaluminum chloride, ethylaluminum sesquichloride, ethylaluminum dichloride, ethoxyaluminum dichloride, aluminum trichloride, etc. Any of these within each group and/or of different groups may be used in admixture with each other.

<Contact>

Any desired publicly known method may be employed for the contact between component (A-1-1) to component (A-1-3), or between component (A-1-1) to component (A-1-4). The preferred method is contact while stirring in the presence of an inert diluting agent. The inert diluting agent used here is preferably an aliphatic or aromatic hydrocarbon or halohydrocarbon. For the contact there may be included components other than those mentioned above, for example siloxanes, organic aluminum compounds, halogenated silicon compounds and organic silicon compounds, so long as the effect of the invention is not hindered. The contact temperature is generally about −50° C. to 200° C. and preferably 0° C. to 120° C., and the treatment time is at least 3 minutes, and preferably 0.5–24 hours.

The ratios for each of the components used for contact are about 0.001–1, and preferably 0.005–0.2, as the weight ratio of Mg atoms in component (A-1-2) with respect to the ion-exchangeable layered silicate of component (A-1-1), and 0.001–50, and preferably 0.01–10, as the molar ratio of Ti atoms in component (A-1-3) with respect to Mg atoms in component (A-1-2). It is about 0.001–50, and preferably 0.01–10, as the molar ratio of Ti, Si or Al atoms in component (A-1-4) with respect to Mg atoms in component (A-1-2). The contact preferably results in the titanium being carried on the ion-exchangeable layered silicate of component (A-1-1) at 0.01–20 wt %, and more preferably 0.1–10 wt %.

<<Component (A-2)>>

Component (A-2) is a metallocene-type transition metal compound.

The metallocene-type transition metal compound used for the process of the invention is a compound of a transition metal of Group 3–6 of the Periodic Table having one or two cyclopentadienyl-type ligands which may be substituted, or a cationic complex thereof.

Preferred metallocene-type transition metal compounds are compounds represented by the following general formula [1] or [2].

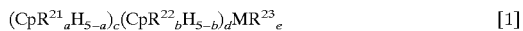
$(CpR^{21}_aH_{5-a})_c(CpR^{22}_bH_{5-b})_dMR^{23}_e$ [1]

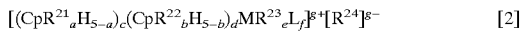
$[(CpR^{21}_aH_{5-a})_c(CpR^{22}_bH_{5-b})_dMR^{23}_eL_f]^{g+}[R^{24}]^{g-}$ [2]

where $CpR^{21}_aH_{5-a}$ and $CpR^{22}_bH_{5-b}$ represent cyclopentadienyl (Cp) groups or derivatives thereof.

In the formulas [1] and [2], $R^{21}$ and $R^{22}$ are hydrocarbon groups, silicon-containing substituents, phosphorus-containing substituents, nitrogen-containing substituents or oxygen-containing substituents of 1–20 and preferably 1–12 carbon atoms, which may be substituted, and they may be the same or different.

Letters a and b are integers of 0–5. Letters c, d and e are 0 or positive integers satisfying the equation c+d+e=V when the metallocene-type transition metal compound is of formula [1], and are 0 or positive integers satisfying the equation c+d+e=V−g when the metallocene-type transition metal compound is of formula [2], where V is the valency of M. Normally, c and d are integers of 0–3, and preferably 0 or 1, e is an integer of 0–3 and preferably 1 or 2, and g is an integer that satisfies $0 \leq g \leq V$.

As specific examples of $R^{21}$ and $R^{22}$ there may be mentioned (a) alkyl groups, for example methyl, ethyl, propyl, isopropyl, butyl, isobutyl, t-butyl, pentyl, isopentyl, hexyl, heptyl, octyl, nonyl, decyl, etc.; (b) aryl groups, for example phenyl, p-tolyl, o-tolyl, m-tolyl, etc.; (c) halo-substituted hydrocarbon groups, for example fluoromethyl, fluoroethyl, fluorophenyl, chloromethyl, chloroethyl, chlorophenyl, bromomethyl, bromoethyl, bromophenyl, iodomethyl, iodoethyl, iodophenyl, etc.; (d) silicon-containing substituents, for example trimethylsilyl, triethylsilyl, triphenylsilyl, etc.; (e) alkoxy groups, for example methoxy, ethoxy, propoxy, isopropoxy, butoxy, isobutoxy, t-butoxy, etc.; (f) aryloxy groups, for example phenoxy, methylphenoxy, pentamethylphenoxy, p-tolyloxy, o-tolyloxy, m-tolyloxy, etc. Preferred among these are alkyl groups of 1–4 carbon atoms, such as methyl, ethyl, propyl, isopropyl, butyl, isobutyl, t-butyl, etc., trimethylsilyl, alkoxy groups such as methoxy, etc., and aryloxy groups such as phenoxy, etc.

When two cyclopentadienyl (Cp) groups are present in the same compound, the Cp groups may be bonded together via a crosslinking group to form a crosslinked structure (in which case, the crosslinking group may be considered as a bonded group between one $R^{21}$ and one $R^{22}$). As such crosslinking groups there may be mentioned (a) alkylene groups, for example methylene and ethylene; (b) alkylidene groups, for example ethylidene, propylidene, isopropylidene, phenylmethylidene and diphenylmethylidene; (c) silicon-containing crosslinking groups, for example dimethylsilylene, diethylsilylene, dipropylsilylene, diisopropylsilylene, diphenylsilylene, methylethylsilylene, methylphenylsilylene, methylisopropylsilylene and methyl-t-butylsilylene; (d) germanium-containing crosslinking groups, for example dimethylgermylene, diethylgermylene, dipropylgermylene, diisopropylgermylene, diphenylgermylene, methylethylgermylene, methylphenylgermylene, methylisopropylgermylene and methyl-t-butylgermylene; (e) nitrogen-containing crosslinking groups, for example amino groups, etc.; (f) phosphorus-containing crosslinking groups, for example phosphinyl, etc.

More than one $R^{21}$ or $R^{22}$ may also be bonded together to form a ring. A typical such case is a structure wherein two $R^{21}$ (or $R^{22}$) groups bonded to adjacent carbon atoms of the same Cp group are bonded together, and specifically there may be mentioned indenyl, tetrahydroindenyl, fluorenyl, octahydrofluorenyl, etc. as preferred ones. These may also be substituted.

$R^{23}$ is a hydrocarbon group of 1 to 20, and preferably 1–10 carbon atoms which may be substituted, hydrogen, a halogen, a silicon-containing substituent, an alkoxy group, an aryloxy group, an amido group or a thioalkoxy group. Specifically there may be mentioned (a) alkyl groups, for example methyl, ethyl, propyl, isopropyl, butyl, isobutyl, t-butyl, pentyl, isopentyl, hexyl, heptyl, octyl, nonyl, decyl, etc.; (b) aryl groups, for example phenyl, p-tolyl, o-tolyl, m-tolyl, etc.; (c) halo-substituted hydrocarbon groups, for example fluoromethyl, fluoroethyl, fluorophenyl, chloromethyl, chloroethyl, chlorophenyl, bromomethyl, bromoethyl, bromophenyl, iodomethyl, iodoethyl, iodophenyl, etc.; (d) halogens, for example fluorine, chlorine, bromine, iodine, etc.; (e) silicon-containing substituents, for example trimethylsilyl, triethylsilyl, triphenylsilyl, etc.; (f) alkoxy groups, for example methoxy, ethoxy, propoxy, isopropoxy, butoxy, isobutoxy, t-butoxy, etc.; (g) aryloxy groups, for example phenoxy, methylphenoxy, pentamethylphenoxy, p-tolyloxy, m-tolyloxy, o-tolyloxy, etc.; (h) amido groups, for example dimethylamido, diethylamido, dipropylamido, diisopropylamido, ethyl-t-butylamido, bis(trimethylsilyl)amido, etc.; (i) thioalkoxy groups, for example methylthioalkoxy, ethylthioalkoxy, propylthioalkoxy, butylthioalkoxy, t-butylthioalkoxy, phenylthioalkoxy, etc. Preferred among these are hydrogen, methyl, ethyl, propyl, isopropyl, butyl, phenyl, halogens such as chlorine, methoxy, ethoxy, propoxy, isopropoxy, dimethylamido and methylthioalkoxy, of which hydrogen, methyl and chlorine are especially preferred.

$R^{23}$ may be bonded with $R^{21}$, $R^{22}$ or Cp, and as specific examples of such ligands there may be mentioned $CpH_4(CH_2)_hO$— ($1 \leq h \leq 5$), $CpMe_4(CH_2)_iO$— ($1 \leq i \leq 5$), $CpH_4(Me_2Si)(t-Bu)N$—, $CpMe_4(Me_2Si)(t-Bu)N$—, etc. (where Cp represents cyclopentadienyl, Me represents methyl and Bu represents butyl). More than one $R^{23}$ may also be bonded together to form a bidentate ligand. As specific examples of this type of $R^{23}$ there may be mentioned —$OCH_2O$—, —$OCH_2CH_2O$—, —$O(o$—$C_6H_4)O$—, etc.

M is an atom of Group 3, 4, 5 or 6 of the Periodic Table, and specifically there may be mentioned scandium, yttrium, lanthanum, cerium, praseodymium, neodymium, samarium, europium, gadolinium, terbium, dysprosium, holmium, erbium, thulium, ytterbium, lutetium, actinium, thorium, protoactinium, uranium, titanium, zirconium, hafnium, vanadium, niobium, tantalum, chromium, molybdenum and tungsten. Among these, titanium, zirconium and hafnium of Group 4 are preferred for use. These may also be used in combination.

L represents an electrically neutral ligand of which f is the number representing an integer of 0 or greater, and specifically there may be mentioned ethers such as diethyl ether, tetrahydrofuran and dioxane, nitriles such as acetonitrile, amides such as dimethylformamide, phosphines such as trimethylphosphine and amines such as trimethylamine. Tetrahydrofuran, trimethylphosphine and trimethylamine are preferred.

$[R^{24}]^{g-}$ represents one or more anions that neutralize the cation, and specifically there may be mentioned tetraphenylborate, tetra(p-tolyl)borate, carbadodecaborate, dicarbaundecaborate, tetrakis(pentafluorophenyl)borate, tetrafluoroborate, hexafluorophosphate, etc. Preferred are tetraphenylborate, tetra(p-tolyl)borate, tetrakis (pentafluorophenyl)borate, tetrafluoroborate and hexafluorophosphate.

Specific examples of the aforementioned metallocene-type transition metal compound are listed below. The following correspond to formula [1] where zirconium is used:

(1) bis(methylcyclopentadienyl)zirconium dichloride,
(2) bis(ethylcyclopentadienyl)zirconium dichloride,
(3) bis(methylcyclopentadienyl)zirconium dimethyl,
(4) bis(ethylcyclopentadienyl)zirconium dimethyl,
(5) bis(methylcyclopentadienyl)zirconium dihydride,
(6) bis(ethylcyclopentadienyl)zirconium dihydride,
(7) bis(dimethylcyclopentadienyl)zirconium dichloride,
(8) bis(trimethylcyclopentadienyl)zirconium dichloride,
(9) bis(tetramethylcyclopentadienyl)zirconium dichloride,
(10) bis(ethyltetramethylcyclopentadienyl)zirconium dichloride,
(11) bis(indenyl)zirconium dichloride,
(12) bis(dimethylcyclopentadienyl)zirconium dimethyl,
(13) bis(trimethylcyclopentadienyl)zirconium dimethyl,
(14) bis(tetramethylcyclopentadienyl)zirconium dimethyl,
(15) bis(ethyltetramethylcyclopentadienyl)zirconium dimethyl,
(16) bis(indenyl)zirconium dimethyl,
(17) bis(dimethylcyclopentadienyl)zirconium dihydride,
(18) bis(trimethylcyclopentadienyl)zirconium dihydride,
(19) bis(ethyltetramethylcyclopentadienyl)zirconium dihydride,
(20) bis(trimethylsilylcyclopentadienyl)zirconium dimethyl,
(21) bis(trimethylsilylcyclopentadienyl)zirconium dihydride,
(22) bis(trifluoromethylcyclopentadienyl)zirconium dichloride,
(23) bis(trifluoromethylcyclopentadienyl)zirconium dimethyl,
(24) bis(trifluoromethylcyclopentadienyl)zirconium dihydride,
(25) isopropylidene-bis(indenyl)zirconium dichloride,
(26) isopropylidene-bis(indenyl)zirconium dimethyl,
(27) isopropylidene-bis(indenyl)zirconium dihydride,
(28) pentamethylcyclopentadienyl(cyclopentadienyl) zirconium dichloride,
(29) pentamethylcyclopentadienyl(cyclopentadienyl) zirconium dimethyl,
(30) pentamethylcyclopentadienyl(cyclopentadienyl) zirconium dihydride,
(31) ethyltetramethylcyclopentadienyl(cyclopentadienyl) zirconium dihydride,
(32) isopropylidene(cyclopentadienyl)(fluorenyl)zirconium dichloride,
(33) isopropylidene(cyclopentadienyl)(fluorenyl)zirconium dimethyl,
(34) dimethylsilyl(cyclopentadienyl)(fluorenyl)zirconium dimethyl,
(35) isopropylidene(cyclopentadienyl)(fluorenyl)zirconium dihydride,
(36) bis(cyclopentadienyl)zirconium dichloride,
(37) bis(cyclopentadienyl)zirconium dimethyl,
(38) bis(cyclopentadienyl)zirconium diethyl,
(39) bis(cyclopentadienyl)zirconium dipropyl,
(40) bis(cyclopentadienyl)zirconium diphenyl,
(41) methylcyclopentadienyl(cyclopentadienyl)zirconium dichloride,
(42) ethylcyclopentadienyl(cyclopentadienyl)zirconium dichloride,
(43) methylcyclopentadienyl(cyclopentadienyl)zirconium dimethyl,
(44) ethylcyclopentadienyl(cyclopentadienyl)zirconium dimethyl,
(45) methylcyclopentadienyl(cyclopentadienyl)zirconium dihydride,
(46) ethylcyclopentadienyl(cyclopentadienyl)zirconium dihydride,
(47) dimethylcyclopentadienyl(cyclopentadienyl)zirconium dichloride,
(48) trimethylcyclopentadienyl(cyclopentadienyl)zirconium dichloride,
(49) tetramethylcyclopentadienyl(cyclopentadienyl) zirconium dichloride,
(50) bis(pentamethylcyclopentadienyl)zirconium dichloride,
(51) tetramethylcyclopentadienyl(cyclopentadienyl) zirconium dichloride,
(52) indenyl(cyclopentadienyl)zirconium dichloride,
(53) dimethylcyclopentadienyl(cyclopentadienyl)zirconium dimethyl,
(54) trimethylcyclopentadienyl(cyclopentadienyl)zirconium dimethyl,
(55) tetramethylcyclopentadienyl(cyclopentadienyl) zirconium dimethyl,
(56) bis(pentamethylcyclopentadienyl)zirconium dimethyl,
(57) ethyltetramethylcyclopentadienyl(cyclopentadienyl) zirconium dimethyl,
(58) indenyl(cyclopentadienyl)zirconium dimethyl,
(59) dimethylcyclopentadienyl(cyclopentadienyl)zirconium dihydride,
(60) trimethylcyclopentadienyl(cyclopentadienyl)zirconium dihydride,
(61) bis(pentamethylcyclopentadienyl)zirconium dihydride,
(62) indenyl( cyclopentadienyl)zirconium dihydride,
(63) trimethylsilylcyclopentadienyl(cyclopentadienyl) zirconium dimethyl,
(64) trimethylsilylcyclopentadienyl(cyclopentadienyl) zirconium dihydride,
(65) trifluoromethylcyclopentadienyl(cyclopentadienyl) zirconium dichloride,
(66) trifluoromethylcyclopentadienyl(cyclopentadienyl) zirconium dimethyl,
(67) trifluoromethylpentadienyl(cyclopentadienyl) zirconium dihydride,
(68) bis(cyclopentadienyl)(trimethylsilyl)(methyl) zirconium,
(69) bis(cyclopentadienyl)(triphenylsilyl)(methyl) zirconium,
(70) bis(cyclopentadienyl)[tris(trimethylsilyl)silyl] (methyl) zirconium,
(71) bis(cyclopentadienyl)[bis(methylsilyl)silyl](methyl) zirconium,
(72) bis(cyclopentadienyl)(trimethylsilyl) (trimethylsilylmethyl)zirconium,
(73) bis(cyclopentadienyl)(trimethylsilyl)(benzyl) zirconium,
(74) methylene-bis(cyclopentadienyl)zirconium dichloride,
(75) ethylene-bis(cyclopentadienyl)zirconium dichloride,
(76) isopropylidene-bis(cyclopentadienyl)zirconium dichloride,
(77) dimethylsilyl-bis(cyclopentadienyl)zirconium dichloride,
(78) methylene-bis(cyclopentadienyl)zirconium dimethyl,
(79) ethylene-bis(cyclopentadienyl)zirconium dimethyl,
(80) isopropylidene-bis(cyclopentadienyl)zirconium dimethyl,
(81) dimethylsilyl-bis(cyclopentadienyl)zirconium dimethyl,

(82) methylene-bis(cyclopentadienyl)zirconium dihydride,
(83) ethylene-bis(cyclopentadienyl)zirconium dihydride,
(84) isopropylidene-bis(cyclopentadienyl)zirconium dihydride,
(85) dimethylsilyl-bis(cyclopentadienyl)zirconium dihydride,
(86) bis(cyclopentadienyl)zirconium bis(methanesulfonate),
(87) bis(cyclopentadienyl)zirconium bis(p-toluenesulfonate),
(88) bis(cyclopentadienyl)zirconium bis (trifluoromethanesulfonate),
(89) bis(cyclopentadienyl)zirconium trifluoromethanesulfonate chloride,
(90) bis(cyclopentadienyl)zirconium bis(benzenesulfonate),
(91) bis(cyclopentadienyl)zirconium bis (pentafluorobenzenesulfonate),
(92) bis(cyclopentadienyl)zirconium benzenesulfonate chloride,
(93) bis(cyclopentadienyl)zirconium(ethoxy) trifluoromethanesulfonate,
(94) bis(tetramethylcyclopentadienyl)zirconium bis (trifluoromethanesulfonate),
(95) bis(indenyl)zirconium bis(trifluoromethanesulfonate),
(96) ethylene-bis(indenyl)zirconium bis (trifluoromethanesulfonate),
(97) isopropylidene-bis(indenyl)zirconium bis (trifluoromethanesulfonate),
(98) (tertiary butylamido)dimethyl (tetramethylcyclopentadienyl)silane dibenzyl zirconium,
(99) (tertiary butylamido)dimethyl (2,3,4,5-tetramethylcyclopentadienyl)silane dibenzyl zirconium,
(100) indenyl zirconium tris(dimethylamide),
(101) indenyl zirconium tris(diethylamide),
(102) indenyl zirconium tris(di-n-propylamide),
(103) cyclopentadienyl zirconium tris(dimethylamide),
(104) methylcyclopentadienyl zirconium tris (dimethylamide),
(105) (tertiary butylamido)(tetramethylcyclopentadienyl)-1,2-ethandiyl zirconium dichloride,
(106) (methylamido)-(tetramethylcyclopentadienyl)-1,2-ethandiyl zirconium dichloride,
(107) (ethylamido)(tetramethylcyclopentadienyl)methylene zirconium dichloride,
(108) (tertiary butylamido)dimethyl (tetramethylcyclopentadienyl)silane zirconium dichloride,
(109) (benzylamido)dimethyl(tetramethylcyclopentadienyl)silane zirconium dichloride,
(110) (phenylphosphido)dimethyl (tetramethylcyclopentadienyl)silane zirconium dibenzyl,
(111) (phenylamido)dimethyl(tetramethylcyclopentadienyl) silane zirconium dichloride,
(112) (2-methoxyphenylamido)dimethyl (tetramethylcyclopentadienyl)silane zirconium dichloride,
(113) (4-fluorophenylamido)dimethyl (tetramethylcyclopentadienyl)silane zirconium dichloride,
(114) ((2,6-di(1-methylethyl)phenyl)amido)methyl (tetramethylcyclopentadienyl)silane zirconium dichloride, etc.
(115) bis(n-butylcyclopentadienyl)zirconium dichloride,
(116) bis(n-butylcyclopentadienyl)zirconium dimethyl,
(117) bis(n-butylcyclopentadienyl)zirconium dihydride,
(118) bis(methyl, n-butylcyclopentadienyl)zirconium dichloride,
(119) bis(methyl, n-butylcyclopentadienyl)zirconium dimethyl,
(120) bis(methyl, n-butylcyclopentadienyl)zirconium dihydride,
(121) methylene-bis(indenyl)zirconium dichloride,
(122) methylene-bis(indenyl)zirconium dimethyl,
(123) methylene-bis(indenyl)zirconium dihydride,
(124) ethylene-bis(indenyl)zirconium dichloride,
(125) ethylene-bis(indenyl)zirconium dimethyl,
(126) ethylene-bis(indenyl)zirconium dihydride,
(127) ethylene-bis(4,5,6,7-tetrahydroindenyl)zirconium dichloride,
(128) ethylene-bis(4,5,6,7-tetrahydroindenyl)zirconium dimethyl,
(129) ethylene-bis(4,5,6,7-tetrahydroindenyl)zirconium dihydride,
(130) dimethylsilyl-bis(indenyl)zirconium dichloride,
(131) dimethylsilyl-bis(indenyl)zirconium dimethyl,
(132) dimethylsilyl-bis(indenyl)zirconium dihydride,
(133) dimethylsilyl-bis(2-methylindenyl)zirconium dichloride,
(134) dimethylsilyl-bis(2-methylindenyl)zirconium dimethyl,
(135) dimethylsilyl-bis(2-methylindenyl)zirconium dihydride,
(136) dimethylsilyl-bis(2-methyl,4-phenylindenyl) zirconium dichloride,
(137) dimethylsilyl-bis(2-methyl,4-phenylindenyl) zirconium dimethyl,
(138) dimethylsilyl-bis(2-methyl,4-phenylindenyl) zirconium dihydride,
(139) dimethylsilyl-bis(2-methylbenzoindenyl)zirconium dichloride,
(140) dimethylsilyl-bis(2-methylbenzoindenyl)zirconium dimethyl,
(141) dimethylsilyl-bis(2-methylbenzoindenyl)zirconium dihydoride,
(142) dimethylsilyl-bis(2-methyl,4-phenylazulenyl) zirconium dichloride,
(143) dimethylsilyl-bis(2-methyl,4-phenylazulenyl) zirconium dimethyl,
(144) dimethylsilyl-bis(2-methyl,4-phenylazulenyl) zirconium dihydoride, The following correspond to formula [2] where zirconium is used:

(1) bis(methylcyclopentadienyl)zirconium(chloride) (tetraphenylborate)tetrahydrofuran complex,
(2) bis(ethylcyclopentadienyl)zirconium(chloride) (tetraphenylborate)tetrahydrofuran complex,
(3) bis(methylcyclopentadienyl)zirconium(methyl) (tetraphenylborate)tetrahydrofuran complex,
(4) bis(ethylcyclopentadienyl)zirconium(methyl) (tetraphenylborate)tetrahydrofuran complex,
(5) bis(methylcyclopentadienyl)zirconium(hydride) (tetraphenylborate)tetrahydrofuran complex,
(6) bis(ethylcyclopentadienyl)zirconium(hydride) (tetraphenylborate)tetrahydrofuran complex,
(7) bis(dimethylcyclopentadienyl)zirconium(chloride) (tetraphenylborate)tetrahydrofuran complex,
(8) bis(trimethylcyclopentadienyl)zirconium(chloride) (tetraphenylborate)tetrahydrofuran complex,
(9) bis(tetramethylcyclopentadienyl)zirconium(chloride) (tetraphenylborate)tetrahydrofuran complex,
(10) bis(ethyltetramethylcyclopentadienyl)zirconium (chloride)(tetraphenylborate)tetrahydrofuran complex,
(11) bis(indenyl)zirconium(chloride)(tetraphenylborate) tetrahydrofuran complex,

(12) bis(dimethylcyclopentadienyl)zirconium(methyl)(tetraphenylborate)tetrahydrofuran complex,
(13) bis(trimethylcyclopentadienyl)zirconium(methyl)(tetraphenylborate)tetrahydrofuran complex,
(14) bis(tetramethylcyclopentadienyl)zirconium(methyl)(tetraphenylborate)tetrahydrofuran complex,
(15) bis(ethyltetramethylcyclopentadienyl)zirconium(methyl)(tetraphenylborate)tetrahydrofuran complex,
(16) bis(indenyl)zirconium(methyl)(tetraphenylborate)tetrahydrofuran complex,
(17) bis(dimethylcyclopentadienyl)zirconium(hydride)(tetraphenylborate)tetrahydrofuran complex,
(18) bis(trimethylcyclopentadienyl)zirconium(hydride)(tetraphenylborate)tetrahydrofuran complex,
(19) bis(ethyltetramethylcyclopentadienyl)zirconium(hydride)(tetraphenylborate)tetrahydrofuran complex,
(20) bis(trimethylsilylcyclopentadienyl)zirconium(methyl)(tetraphenylborate)tetrahydrofuran complex,
(21) bis(trimethylsilylcyclopentadienyl)zirconium(hydride)(tetraphenylborate)tetrahydrofuran complex,
(22) bis(trifluoromethylcyclopentadienyl)zirconium(methyl)(tetraphenylborate)tetrahydrofuran complex,
(23) bis(trifluoromethylcyclopentadienyl)zirconium(hydride)(tetraphenylborate)tetrahydrofuran complex,
(24) isopropylidene-bis(indenyl)zirconium(chloride)(tetraphenylborate)tetrahydrofuran complex,
(25) isopropylidene-bis(indenyl)zirconium(methyl)(tetraphenylborate)tetrahydrofuran complex,
(26) isopropylidene-bis(indenyl)zirconium(hydride)(tetraphenylborate)tetrahydrofuran complex,
(27) pentamethylcyclopentadienyl(cyclopentadienyl)zirconium(chloride)(tetraphenylborate)tetrahydrofuran complex,
(28) ethyltetramethylcyclopentadienyl(cyclopentadienyl)zirconium(chloride)(tetraphenylborate)tetrahydrofuran complex,
(29) pentamethylcyclopentadienyl(cyclopentadienyl)zirconium(methyl)(tetraphenylborate)tetrahydrofuran complex,
(30) ethyltetramethylcyclopentadienyl(cyclopentadienyl)zirconium(methyl)(tetraphenylborate)tetrahydrofuran complex,
(31) pentamethylcyclopentadienyl(cyclopentadienyl)zirconium(hydride)(tetraphenylborate)tetrahydrofuran complex,
(32) ethyltetramethylcyclopentadienyl(cyclopentadienyl)zirconium(hydride)(tetraphenylborate)tetrahydrofuran complex,
(33) isopropylidene(cyclopentadienyl)(fluorenyl)zirconium(chloride)(tetraphenylborate)tetrahydrofuran complex,
(34) isopropylidene(cyclopentadienyl)(fluorenyl)zirconium(methyl)(tetraphenylborate)tetrahydrofuran complex,
(35) isopropylidene(cyclopentadienyl)(fluorenyl)zirconium(hydride)(tetraphenylborate)tetrahydrofuran complex,
(36) bis(cyclopentadienyl)zirconium(chloride)(tetraphenylborate)tetrahydrofuran complex,
(37) bis(cyclopentadienyl)zirconium(methyl)(tetraphenylborate)tetrahydrofuran complex,
(38) bis(cyclopentadienyl)zirconium(ethyl)(tetraphenylborate)tetrahydrofuran complex,
(39) bis(cyclopentadienyl)zirconium(propyl)(tetraphenylborate)tetrahydrofuran complex,
(40) bis(cyclopentadienyl)zirconium(phenyl)(tetraphenylborate)tetrahydrofuran complex,
(41) methylcyclopentadienyl(cyclopentadienyl)zirconium(chloride)(tetraphenylborate)tetrahydrofuran complex,
(42) ethylcyclopentadienyl(cyclopentadienyl)zirconium(chloride)(tetraphenylborate)tetrahydrofuran complex,
(43) bis(ethylcyclopentadienyl)zirconium(chloride)(tetraphenylborate)tetrahydrofuran complex,
(44) methylcyclopentadienyl(cyclopentadienyl)zirconium(methyl)(tetraphenylborate)tetrahydrofuran complex,
(45) ethylcyclopentadienyl(cyclopentadienyl)zirconium(methyl)(tetraphenylborate)tetrahydrofuran complex,
(46) methylcyclopentadienyl(cyclopentadienyl)zirconium(hydride)(tetraphenylborate)tetrahydrofuran complex,
(47) ethylcyclopentadienyl(cyclopentadienyl)zirconium(hydride)(tetraphenylborate)tetrahydrofuran complex,
(48) dimethylcyclopentadienyl(cyclopentadienyl)zirconium(chloride)(tetraphenylborate)tetrahydrofuran complex,
(49) trimethylcyclopentadienyl(cyclopentadienyl)zirconium(chloride)(tetraphenylborate)tetrahydrofuran complex,
(50) tetramethylcyclopentadienyl(cyclopentadienyl)zirconium(chloride)(tetraphenylborate)tetrahydrofuran complex,
(51) bis(pentamethylcyclopentadienyl)zirconium(chloride)(tetraphenylborate)tetrahydrofuran complex,
(52) indenyl(cyclopentadienyl)zirconium(chloride)(tetraphenylborate)tetrahydrofuran complex,
(53) dimethylcyclopentadienyl(cyclopentadienyl)zirconium(methyl)(tetraphenylborate)tetrahydrofuran complex,
(54) trimethylcyclopentadienyl(cyclopentadienyl)zirconium(methyl)(tetraphenylborate)tetrahydrofuran complex,
(55) tetramethylcyclopentadienyl(cyclopentadienyl)zirconium(methyl)(tetraphenylborate)tetrahydrofuran complex,
(56) bis(pentamethylcyclopentadienyl)zirconium(methyl)(tetraphenylborate)tetrahydrofuran complex,
(57) cyclopentadienyl(indenyl)zirconium(methyl)(tetraphenylborate)tetrahydrofuran complex,
(58) dimethylcyclopentadienyl(cyclopentadienyl)zirconium(hydride)(tetraphenylborate)tetrahydrofuran complex,
(59) trimethylcyclopentadienyl(cyclopentadienyl)zirconium(hydride)(tetraphenylborate)tetrahydrofuran complex,
(60) bis(pentamethylcyclopentadienyl)zirconium(hydride)(tetraphenylborate)tetrahydrofuran complex,
(61) indenyl(cyclopentadienyl)zirconium(hydride)(tetraphenylborate)tetrahydrofuran complex,
(62) trimethylsilylcyclopentadienyl(cyclopentadienyl)zirconium(methyl)(tetraphenylborate)tetrahydrofuran complex,
(63) trimethylsilylcyclopentadienyl(cyclopentadienyl)zirconium(hydride)(tetraphenylborate)tetrahydrofuran complex,
(64) trifluoromethylcyclopentadienyl(cyclopentadienyl)zirconium(hydride)(tetraphenylborate)tetrahydrofuran complex,
(65) bis(cyclopentadienyl)(trimethylsilyl)zirconium(tetraphenylborate)tetrahydrofuran complex,
(66) bis(cyclopentadienyl)(triphenylsilyl)zirconium(tetraphenylborate)tetrahydrofuran complex,
(67) bis(cyclopentadienyl)[tris(trimethylsilyl)silyl]zirconium(tetraphenylborate)tetrahydrofuran complex,
(68) bis(cyclopentadienyl)(trimethylsilylmethyl)zirconium(tetraphenylborate)tetrahydrofuran complex,
(69) bis(cyclopentadienyl)(benzyl)zirconium(tetraphenylborate)tetrahydrofuran complex,
(70) methylene-bis(cyclopentadienyl)zirconium(chloride)(tetraphenylborate)tetrahydrofuran complex,
(71) ethylene-bis(cyclopentadienyl)zirconium(chloride)(tetraphenylborate)tetrahydrofuran complex,
(72) isopropylidene-bis(cyclopentadienyl)zirconium(chloride)(tetraphenylborate)tetrahydrofuran complex,
(73) dimethylsilyl-bis(cyclopentadienyl)zirconium(chloride)(tetraphenylborate)tetrahydrofuran complex,

(74) methylene-bis(cyclopentadienyl)zirconium(methyl) (tetraphenylborate)tetrahydrofuran complex,
(75) ethylene-bis(cyclopentadienyl)zirconium(methyl) (tetraphenylborate)tetrahydrofuran complex,
(76) isopropylidene-bis(cyclopentadienyl)zirconium (methyl)(tetraphenylborate)tetrahydrofuran complex,
(77) dimethylsilyl-bis(cyclopentadienyl)zirconium(methyl) (tetraphenylborate)tetrahydrofuran complex,
(78) methylene-bis(cyclopentadienyl)zirconium(hydride) (tetraphenylborate)tetrahydrofuran complex,
(79) ethylene-bis(cyclopentadienyl)zirconium(hydride) (tetraphenylborate)tetrahydrofuran complex,
(80) isopropylidene-bis(cyclopentadienyl)zirconium (hydride)(tetraphenylborate)tetrahydrofuran complex,
(81) dimethylsilyl-bis(cyclopentadienyl)zirconium(hydride) (tetraphenylborate)tetrahydrofuran complex,
(82) bis(cyclopentadienyl)zirconium(methanesulfonate) (tetraphenylborate)tetrahydrofuran complex,
(83) bis(cyclopentadienyl)zirconium(p-toluenesulfonate) (tetraphenylborate)tetrahydrofuran complex,
(84) bis(cyclopentadienyl)zirconium (trifluoromethanesulfonate)(tetraphenylborate) tetrahydrofuran complex,
(85) bis(cyclopentadienyl)zirconium(benzenesulfonate) (tetraphenylborate)tetrahydrofuran complex,
(86) bis(cyclopentadienyl)zirconium (pentafluorobenzenesulfonate)(tetraphenylborate) tetrahydrofuran complex,
(87) bis(tetramethylcyclopentadienyl)zirconium (trifluoromethanesulfonate)(tetraphenylborate) tetrahydrofuran complex,
(88) bis(indenyl)zirconium(trifluoromethanesulfonate) (tetraphenylborate)tetrahydrofuran complex,
(89) ethylenebis(indenyl)zirconium (trifluoromethanesulfonate)(tetraphenylborate) tetrahydrofuran complex,
(90) isopropylidene-bis(indenyl)zirconium (trifluoromethanesulfonate)(tetraphenylborate) tetrahydrofuran complex, etc.

In the examples mentioned above, disubstituents of the cyclopentadienyl ring include 1,2- and 1,3-substituents, and trisubstituents include 1,2,3- and 1,2,4-substituents.

There may also be mentioned compounds similar to those listed above, using compounds of other metals of Groups 3, 4, 5 and 6, such as titanium compounds and hafnium compounds. Mixtures of these compounds may also be used.

<<Preparation of Component (A)>>

Component (A) of the invention comprises the above-mentioned component (A-1) and component (A-2). Component (A) can be obtained by contacting these two components outside of the reaction system, or it may be synthesized inside the system. When the two components are contacted, there may be employed, for example, a mechanical mixing method using a revolving ball mill, oscillating mill, jet mill, medium agitating pulverizer or the like, a method of contact by agitation in the presence of an inert diluting agent, or a method of forced carrying by co-drying or co-precipitation. The inert solvent used here is preferably an aliphatic, alicyclic or aromatic hydrocarbon or halohydrocarbon compound. The contact may be carried out in any desired order.

For the contact, there may be included components other than those mentioned above, for example organic aluminum compounds, organometallic compounds, organic silicon compounds, siloxanes and halogenated silicon compounds, so long as the effect of the invention is not hindered. The contact temperature is usually about −50° C. to 200° C. The amount of the components used for the contact is in the range of 0.0001–10 mmol, and preferably 0.001–5 mmol of component (A-2) to 1 gram of component (A-1).

Component (A) can be subjected to pre-polymerization treatment which comprises polymerizing a small amount of an ethylenic unsaturated compound in the presence of an organic aluminum compound. The organic aluminum compound used therefor may be, specifically, component (B) described below. The ethylenic unsaturated compound used may be, specifically, α-olefins such as ethylene, propylene, butene, pentene, hexene, etc., styrenes such as styrene, divinylbenzene, etc., dienes such as butadiene, isoprene, 1,9-decadiene, 1,7-octadiene, etc., or cyclic olefins such as cyclopentene, norbornene, etc. The pre-polymerization is preferably carried out to produce about 0.01–1000 g, and preferably 0.1–100 g of polymer per 1 gram of the solid catalyst component (A).

<Component (B)/organic Aluminum Compound>

Component (B) is an organic aluminum compound.

The organic aluminum compound used for the invention may be a compound represented by the general formula $R'_{3-h}AlX_h$ or $R'_{3-i}Al(OR'')_i$ (where $R'$ and $R''$ are hydrocarbon residues of 1–20 carbon atoms, or hydrogen atoms, X is a halogen, and h and i are such that $0 \leq h < 3$ and $0 \leq i < 3$). Specific examples include (a) trialkylaluminums, for example trimethylaluminum, triethylaluminum, tripropylaluminum, triisobutylaluminum, trihexylaluminum, trioctylaluminum, tridecylaluminum, etc.; (b) alkylaluminum halides, for example diethylaluminum chloride, diisobutylaluminum chloride, ethylaluminum sesquichloride, ethylaluminum dichloride, etc.; (c) alkylaluminum hydrides, for example diethylaluminum hydride, diisobutylaluminum hydride, etc.; and (d) alkylaluminum alkoxides, for example diethylaluminum ethoxide, diethylaluminum phenoxide, etc. There may also be used (e) alumoxanes, for example methylalumoxane, isobutylalumoxane, etc. These may also be used in combinations of two or more. Preferred among these are trialkylaluminums.

These are generally used in an amount such that the proportion is Al/M=0.1–100,000 mole/mole, and preferably Al/M=1–10,000 mole/mole, as the ratio with the metallocene-type transition metal compound in the solid catalyst component (A).

[Olefin Polymerization]

A publicly known olefin polymerization process may be employed for production of a polymer according to the invention. That is, it may be carried out with a batch system, a continuous system or a semi-batch system. It may also be carried out by a polymerization process wherein the medium is an inert hydrocarbon such as propane, butane, pentane, hexane, heptane, toluene or cyclohexane, by a polymerization process wherein the used monomer itself is the medium, or by a polymerization process in a gas phase using no medium.

The olefin polymerized by the polymerization process of the invention is represented by the general formula $R^{30}$—CH=CH$_2$ (where $R^{30}$ represents a hydrogen atom or a hydrocarbon residue of 1–10 carbon atoms), and specific examples thereof include olefins such as ethylene, propylene, 1-butene, 1-pentene, 3-methylbutene-1,1-hexene, 4-methylpentene-1,1-octene, styrene, etc. These may be used in combination with each other for random copolymerization or block copolymerization.

The process of the invention may be used to produce isotactic polymers, syndiotactic polymers or atactic polymers.

The polymerization conditions are in the range of a polymerization temperature of 0–280° C., and preferably 50–250° C., and a polymerization pressure of normally 1–2000 kg/cm²G. If necessary, the molecular weight may be controlled for the polymerization by using a molecular weight adjuster such as hydrogen.

EXAMPLES

In the following examples, MI is the flow rate according to JIS K6760 at 190° C. under a load of 2.16 kg, FR is the ratio of MI under a load of 2.16 kg and the flow rate measured under a load of 10 kg, measured at 190° C. using the same apparatus used for measurement of MI, and it is represented by FR=(flow rate under 10 kg load)/(flow rate under 2.16 kg load).

MT is the melt tension measured using a capillograph manufactured by Toyo Precision Instruments Laboratory, KK., with a nozzle diameter of 2.095 mm, a nozzle length of 8 mm, an extrusion speed of 1.0 cm/min and a draw-out rate of 4.0 m/min, at 190° C.

Example A1

[Production of Component (A-1)]

In 3.2 kg of demineralized water in which 0.2 kg of zinc sulfate had been dissolved there was dispersed 1 kg of synthetic mica (ME-100, manufactured by Cope Chemical Co.), and the mixture was stirred at room temperature for one hour and filtered. After subsequent washing with demineralized water, the solid concentration was adjusted to 25%, and the slurry was introduced into a spray drier to obtain globular granulated particles. The particles were dried under reduced pressure at 200° C. for 2 hours to obtain component (A-1-1).

A 5 g portion of this component (A-1-1) was placed in a thoroughly dried, $N_2$-substituted flask and was dispersed in 50 ml of dehydrated heptane, after which MAGARA-BEM (manufactured by Toso-Akuzo) as component (A-1-2) was added to 3.56 mmol in terms of Mg atoms and the mixture was stirred at 50° C. for one hour. Next, 4.3 ml of a 10% $TiCl_4$ (component (A-1-3)) heptane solution was added and the mixture was further stirred at 50° C. for one hour. After completion of the reaction, the product was dried under reduced pressure to obtain component (A-1). The Ti content thereof was 1.60 wt %.

[Production of Component (A)]

A 500 mg portion of component (A-1) was introduced into a 100 ml flask that had been adequately nitrogen-substituted, and then 25 ml of purified toluene was added to make a slurry. Into this there were introduced 0.04 mmol of bis(n-butylcyclopentadienyl)zirconium dichloride and 0.5 mmol of triethylaluminum, and the mixture was reacted for 5 minutes at room temperature to obtain catalyst component (A).

[Polymerization]

Into an autoclave with an internal volume of 1.5 liters equipped with a stirring and temperature control apparatus there was introduced 0.8 liter of adequately purified n-heptane. Next, 0.35 mmnol of triethylaluminum, 4 ml of 1-hexene and 160 mg of the above-mentioned catalyst component were introduced. After then introducing 100 ml of hydrogen, ethylene was introduced to a total pressure of 5 kg/cm²G and polymerization procedure was carried out for 3 hours at 90° C.

As a result there was obtained 168.0 g of polymer. The MI of the product was 0.026 and the FR was 17.8. Based on GPC, the polymer had a double-peak structure with an Mn of 36,200 and an Mw of 404,900. The MT of the polymer was 53.8 g.

Example A2

[Production of Component (A)]

Component (A-1-1) was synthesized in the same manner as in Example A1. For production of component (A-1), 5 g of component (A-1-1) was placed in a thoroughly dried, $N_2$-substituted flask and was dispersed in 50 ml of dehydrated heptane, after which 2.1 mmol of $TiCl_4$ (component (A-1-3)) was added and MAGARA-BEM (manufactured by Toso-Akuzo) as component (A-1-2) was added dropwise to 2.1 mmol in terms of Mg atoms, and the mixture was stirred at room temperature for one hour. After completion of the reaction, the product was thoroughly washed with dehydrated heptane and dried under reduced pressure to obtain component (A-1). The Ti content of component (A-1) was 1.28 wt %.

Component (A) was produced in the same manner as Example A1, except that this product was used as component (A-1).

[Polymerization]

Polymerization was carried out in the same manner as Example A1, except that no hydrogen was used during the polymerization as in Example A1 and the polymerization time was changed to one hour.

As a result of the polymerization, 110.2 g of polymer was obtained. The MI of the product was 1.15 and the FR was 7.66. Based on GPC, the polymer had a double-peak structure with an Mn of 31,900 and an Mw of 171,300. The MT of the polymer was 5.0 g.

Comparative Example 1

This was carried out in the same manner as Example A1, except that component (A-1-1) was used as component (A-1) in Example A1.

As a result, 80.3 g of polymer was obtained. The MI of the product was 1.68 and the FR was 5.98. The MT of the polymer was 1.4 g.

Example B1

[Production of Component (A-1)]

In 3.2 kg of demineralized water in which 0.2 kg of zinc sulfate had been dissolved there was dispersed 1 kg of synthetic mica (ME-100, manufactured by Cope Chemical Co.), and the mixture was stirred at room temperature for one hour and filtered. After subsequent washing with demineralized water, the solid concentration was adjusted to 25%, and the slurry was introduced into a spray drier to obtain globular granulated particles. The particles were dried under reduced pressure at 200° C. for 2 hours to obtain component (A-1-1).

A 20 g portion of $MgCl_2$ was placed in a thoroughly dried, $N_2$-substituted flask, and then 160 ml of dehydrated heptane and 141 ml of tetrabutoxytitanium were added and the mixture was stirred at 90° C. for 2 hours to obtain an $MgCl_2$ solution (component (A-1-2)).

A 5 g portion of the above mentioned component (A-1-1) was placed in another thoroughly dried, $N_2$-substituted flask and was dispersed in 25 ml of dehydrated heptane, after which component (A-1-2) was added to 6.66 mmol in terms of Mg atoms and the mixture was stirred at room temperature for one hour. This was dried under reduced pressure to obtain a powder. The powder was then dispersed in 50 ml of dehydrated heptane, 1.33 mmol of $SiCl_4$ (component (A-1-4)) was added and the mixture was further stirred at room temperature for 30 minutes, after which 4.73 mmol of $TiCl_4$ (component (A-1-4)) was also added and the mixture was stirred at 50° C. for 3 hours. After completion of the reaction, the product was adequately washed with dehydrated heptane and dried under reduced pressure to obtain component (A-1). The Ti content thereof was 1.04 wt %.

[Production of Component (A)]

A 500 mg portion of component (A-1) was introduced into a 100 ml flask that had been adequately nitrogen-substituted, and then 25 ml of purified toluene was added to make a slurry. Into this there were introduced 0.04 mmol of bis(n-butylcyclopentadienyl) zirconium dichloride and 0.5 mmol of triethylaluminum, and the mixture was reacted for 5 minutes at room temperature to obtain catalyst component (A).

[Polymerization]

Into an autoclave with an internal volume of 1.5 liters equipped with a stirring and temperature control apparatus there was introduced 0.8 liter of adequately purified n-heptane. Next, 0.35 mmol of triethylaluminum, 4 ml of 1-hexene and 160 mg of the above-mentioned catalyst component were introduced. Ethylene was then introduced to a total pressure of 5 kg/cm$^2$G and polymerization procedure was carried out for 1 hour at 90° C.

As a result there was obtained 68.0 g of polymer. The MI of the product was 0.57 and the FR was 9.0. Based on GPC, the polymer had an Mn of 35,600 and an Mw of 165,900. The MT of the polymer was 6.7 g.

Example B2

Component (A-1-1) and component (A-1-2) were synthesized in the same manner as in Example B1. For production of component (A-1), 5 g of component (A-1-1) was placed in a thoroughly dried, N$_2$-substituted flask and was dispersed in 25 ml of dehydrated heptane, after which 3.33 mmol of component (A-1-2) was added in terms of Mg atoms and the mixture was stirred at room temperature for one hour. This was dried under reduced pressure to obtain a powder. The powder was then dispersed in 50 ml of dehydrated heptane, 5.82 mmol of SiCl$_4$ (component (A-1-4)) was added and the mixture was further stirred at 30° C. for 3 hours and then at 90° C. for 3 hours. After adequate washing, 3.84 mmol of ethylaluminum dichloride (component (A-1-4)) was added dropwise and the mixture was stirred at 35° C. for 2 hours. After completion of the reaction, the product was adequately washed with dehydrated heptane and dried under reduced pressure to obtain component (A-1). The Ti content of component (A-1) was 0.18 wt %.

Component (A) was produced and used for a polymerization procedure in the same manner as Example B1, except that this product was used as component (A-1).

As a result of the polymerization there was obtained 82.5 g of polymer. The MI of the product was 0.22 and the FR was 10.8. Based on GPC, the polymer had an Mn of 21,600 and an Mw of 182,000. The MT of the polymer was 14.2 g.

Comparative Example 2

This was carried out in the same manner as Example B1, except that component (A-1-1) was used as component (A-1) in Example B1.

As a result, 80.3 g of polymer was obtained. The MI of the product was 1.68 and the FR was 5.98. The MT of the polymer was 1.4 g.

Example B3

Component (A-1-1) was synthesized in the same manner as in Example B1.

For production of component (A-1), 100 ml of dehydrated heptane and 25.5 mmol of tributoxymonochlortitanium were placed in a thoroughly dried, N$_2$-substituted flask, 25.8 g of Mg(OEt) and 2.33 ml of n-BuOH were added, and the mixture was stirred at 100° C. for 2 hours to obtain a Mg(OEt)$_2$ solution (component (A-1-2)). After placing 5 g of component (A-1-1) in a thoroughly dried, N$_2$-substituted flask and dispersing it in 25 ml of dehydrated heptane, component (A-1-2) was added to 3.33 mmol in terms of Mg atoms, and the mixture was stirred at room temperature for one hour. This was dried under reduced pressure to obtain a powder. The powder was then dispersed in 50 ml of dehydrated heptane, 10.0 mmol of ethylaluminum sesquichloride (component (A-1-4)) was added dropwise at 40° C., and the mixture was stirred at 700° C. for one hour. After completion of the reaction, the product was adequately washed with dehydrated heptane and dried under reduced pressure to obtain component (A-1). The Ti content of component (A-1) was 1.22 wt %.

Component (A) was produced and used for a polymerization procedure in the same manner as Example B1, except that this product was used as component (A-1).

As a result of the polymerization there was obtained 91.4 g of polymer. The MI of the product under a 21.6 load was 0.61. Based on GPC, the polymer had a double-peak structure with an Mn of 54,700 and an Mw of 382,600. The MT of the polymer was 62 g.

Example B4

Component (A-1-1) and component (A-1-2) were synthesized in the same manner as in Example B3. For production of component (A-1), 5 g of component (A-1-1) was placed in a thoroughly dried, N$_2$-substituted flask and was dispersed in 25 ml of dehydrated heptane, after which 2.22 mmol of component (A-1-2) was added in terms of Mg atoms and the mixture was stirred at room temperature for one hour. This was dried under reduced pressure to obtain a powder. The powder was then dispersed in 50 ml of dehydrated heptane, 2.22 mmol of TiCl$_4$ (component (A-1-4)) was added and the mixture was further stirred at 55° C. for 2 hours, and after completion of the reaction the product was adequately washed with dehydrated heptane and dried under reduced pressure to obtain component (A-1). The Ti content of component (A-1) was 1.52 wt %.

Component (A) was produced and used for a polymerization procedure in the same manner as Example B1, except that this product was used as component (A-1).

As a result of the polymerization there was obtained 64.0 g of polymer. The MI of the product was 0.42 and the FR was 8.05. Based on GPC, the polymer had an Mn of 22,700 and an Mw of 156,500. The MT of the polymer was 9.6 g.

Example C1

[Production of Component (A-1)]

In 3.2 kg of demineralized water in which 0.2 kg of zinc sulfate had been dissolved there was dispersed 1 kg of synthetic amica (ME-100, manufactured by Cope Chemical Co.), and the mixture was stirred at room temperature for one hour and filtered. After subsequent washing with demineralized water, the solid concentration was adjusted to 25%, and the slurry was introduced into a spray drier to obtain globular granulated particles. The particles were dried under reduced pressure at 200° C. for 2 hours to obtain component (A-1-1).

A 4.8 g portion of MgCl$_2$ was placed in a thoroughly dried, N$_2$-substituted flask, and then 200 ml of dehydrated heptane and 23.4 ml of 2-ethylhexanol were added and the mixture was stirred at 90° C. for 2 hours to obtain a MgCl$_2$ solution (component (A-1-2)).

A 5 g portion of this component (A-1-1) was placed in another thoroughly dried, $N_2$-substituted flask and was dispersed in 25 ml of dehydrated heptane, after which component (A-1-2) was added to 6.66 mmol in terms of Mg atoms and the mixture was stirred at room temperature for one hour. This was dried under reduced pressure to obtain a powder. The powder was then dispersed in 50 ml of dehydrated heptane, 4 mmol of triethylaluminum was added dropwise over 10 minutes at 20° C., and then the mixture was heated to 80° C. and stirred for 2 hours. After subsequent washing with heptane, 3 ml of $TiCl_4$ (component (A-1-3)) was added and the mixture was stirred at 80° C. for 2 hours. After completion of the reaction, the product was adequately washed with dehydrated heptane and dried under reduced pressure to obtain component (A-1). The Ti content thereof was 1.72 wt %.

[Production of Component (A)]

A 500 mg portion of component (A-1) was introduced into a 100 ml flask that had been adequately nitrogen-substituted, and then 25 ml of purified toluene was added to make a slurry. Into this there were introduced 0.04 mmol of bis(n-butylcyclopentadienyl) zirconium dichloride and 0.5 mmol of triethylaluminum, and the mixture was reacted for 5 minutes at room temperature to obtain catalyst component (A).

[Polymerization]

Into an autoclave with an internal volume of 1.5 liters equipped with a stirring and temperature control apparatus there was introduced 0.8 liter of adequately purified n-heptane. Next, 0.35 mmol of triethylaluminum, 4 ml of 1-hexene and 160 mg of the above-mentioned catalyst component were introduced. Ethylene was then introduced to a total pressure of 5 kg/cm²G and polymerization procedure was carried out for 1 hour at 90° C.

As a result there was obtained 92.4 g of polymer. The MI of the product was 0.70 and the FR was 9.1. Based on GPC, the polymer had an Mn of 35,300 and an Mw of 119,200. The MT of the polymer was 14.9 g.

Example C2

Component (A-1-1) and component (A-1-2) were synthesized in the same manner as in Example C1. For production of component (A-1), 5 g of component (A-1-1) was placed in a thoroughly dried, $N_2$-substituted flask and was dispersed in 25 ml of dehydrated heptane, after which 3.33 mmol of component (A-1-2) was added in terms of Mg atoms and the mixture was stirred at room temperature for one hour. This was dried under reduced pressure to obtain a powder. The powder was then dispersed in 50 ml of dehydrated heptane, 13.3 mmol of $SiCl_4$ was added and the mixture was stirred at 50° C. for 2 hours. After subsequent washing with heptane, 3.84 mmol of $TiCl_4$ (component (A-1-3)) was added and the mixture was stirred at 35° C. for 2 hours. After completion of the reaction, the product was adequately washed with dehydrated heptane and dried under reduced pressure to obtain component (A-1). The Ti content of component (A-1) was 1.13 wt %.

Component (A) was produced and used for a polymerization procedure in the same manner as Example C1, except that this product was used as component (A-1).

As a result of the polymerization there was obtained 55.9 g of polymer. The MI of the product was 0.38 and the FR was 8.6. Based on GPC, the polymer had an Mn of 44,000 and an Mw of 164,000. The MT of the polymer was 52 g.

Comparative Example 3

This was carried out in the same manner as Example C1, except that component (A-1-1) was used as component (A-1) in Example C1.

As a result, 80.3 g of polymer was obtained. The MI of the product was 1.68 and the FR was 5.98. The MT of the polymer was 1.4 g.

By the method of the present invention it is possible to provide a polymerization process which allows production of polymers with good moldability and a wide molecular weight distribution, while also allowing control of the molecular weight distribution. The invention also has excellent operational stability as explained above, because there is no elution or separation of the catalyst component from the solid catalyst component.

What is claimed is:

1. A method for producing an olefin polymerization catalyst comprising component (A) and component (B);
   component (A): a solid catalyst component comprising (A-1) and component (A-2),
      component (A-1): a solid component obtained by contacting component (A-1-1) component, (A-1-2) and component (A-1-3);
         component (A-1-1). an ion-exchangeable layered silicate;
         component (A-1-2): a magnesium compound;
         component (A-1-3): a titanium compound;
      component (A-2): a metallocene transition metal compound;
   component (B): an organic aluminum compound,
   wherein said component (A) is obtained by contacting component (A-1-1), component (A-1-2) and component (A-1-3) to obtain a solid component, followed by washing the thus obtained solid component with hydrocarbon solvent prior to contact with (A-2), and then contacting the solid component with component (A-2) to obtain component (A); comprising mixing component (A) and component (B).

2. The method according to claim 1, wherein component (A-1-2) is an organic magnesium compound.

3. The method according to claim 1, wherein component (A-1-2) is contacted, in advance, with the component (A-1-3).

4. The method according to claim 1, wherein component (A-1-2) is contact, in advance, with an electron donating compound.

5. The method according to claim 1, wherein component (A-1) is a solid component obtained by contacting the following component (A-1-1), component (A-1-2), component (A-1-3) and component (A-1-4),
   component (A-1-1); an ion-exchangeable layered silicate;
   component (A-1-2): a magnesium compound;
   component (A-1-3): a titanium compound;
   component (A-1-4): a compound selected from the group consisting of halogenated titanium compounds, halogenated silicon compounds and halogenated aluminum compounds.

6. The method according to claim 1, wherein said hydrocarbon solvent is dehydrated heptane.

7. A method for producing an olefin polymerization catalyst comprising component (A) and component (B);
   component (A): a solid catalyst component comprising component (A-1) and component (A-2),
      component (A-1): a solid component obtained by contacting component (A-1-1) and component (A-1-2),
         component (A-1-1): an ion-exchangeable layered silicate;
         component (A-1-2): a compound obtained by contacting an inorganic magnesium compound with a titanium compound;

component (A-2): a metallocene transition metal compound, component (B): an organic aluminum compound, wherein said component (A) is obtained by contacting component (A-1-1) and component (A-1-2) to obtain a solid component, followed by washing the thus obtained solid component with hydrocarbon solvent prior to contact with (A-2), and then contacting the solid component with component (A-2) to obtain component (A); comprising mixing component (A) and component (B).

8. The method according to claim 7, wherein component (A-1-2) is contact-treated, in advance, with an electron donating compound.

9. The method according to claim 7, wherein component (A-1) is a solid component obtained by contacting component (A-1-1), component (A-1-2) and component (A-1-4), component (A-1-1): an ion-exchangeable layered silicate component (A-1-2): a compound obtained by contacting an inorganic magnesium compound with an electron donating compound;

component (A-1-4): a compound selected from the group consisting of halogenated titanium compounds, halogenated silicon compounds and halogenated aluminum compounds.

10. The method according to claim 7, wherein said hydrocarbon solvent is dehydrated heptane.

* * * * *